United States Patent
Hirakawa et al.

(10) Patent No.: US 8,110,971 B2
(45) Date of Patent: Feb. 7, 2012

(54) LIGHT EMITTING ELEMENT, LIGHT EMITTING DEVICE, IMAGE DISPLAY DEVICE, METHOD OF DRIVING LIGHT EMITTING ELEMENT, AND METHOD OF PRODUCING LIGHT EMITTING ELEMENT

(75) Inventors: Hiroyuki Hirakawa, Osaka (JP); Yasuo Imura, Osaka (JP); Ayae Nagaoka, Osaka (JP); Tadashi Iwamatsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 85 days.

(21) Appl. No.: 12/782,024

(22) Filed: May 18, 2010

(65) Prior Publication Data
US 2010/0295465 A1 Nov. 25, 2010

(30) Foreign Application Priority Data
May 19, 2009 (JP) .................................. 2009-121457

(51) Int. Cl.
*G02F 1/335* (2006.01)
*G03G 15/02* (2006.01)
(52) U.S. Cl. ......... 313/311; 313/309; 313/491; 313/293
(58) Field of Classification Search .......... 313/309–311, 313/491–497; 257/10–11
See application file for complete search history.

(56) References Cited

U.S. PATENT DOCUMENTS
| | | | |
|---|---|---|---|
| 4,857,161 A | 8/1989 | Borel | |
| 5,891,548 A | 4/1999 | Graiver | |
| 5,962,959 A | 10/1999 | Iwasaki et al. | |
| 6,130,503 A | 10/2000 | Negishi et al. | |
| 6,166,487 A | 12/2000 | Negishi et al. | |
| 6,462,467 B1 | 10/2002 | Russ | |
| 2001/0017369 A1 | 8/2001 | Iwasaki et al. | |
| 2001/0026123 A1 | 10/2001 | Yoneda | |

(Continued)

FOREIGN PATENT DOCUMENTS
CN 1763885 A 4/2006
(Continued)

OTHER PUBLICATIONS
U.S. Appl. No. 12/956,136, filed Nov. 30, 2010, entitled "Electron Emitting Element, Method for Producing Electron Emitting Element, Electron Emitting Device, Charging Device, Image Forming Apparatus, Electron-Beam Curing Device, Image Display Device, Air Blowing Device, Cooling Device" (not yet published), Hiroyuki Hirakawa.

(Continued)

*Primary Examiner* — Anne Hines
*Assistant Examiner* — Tracie Green
(74) *Attorney, Agent, or Firm* — Nixon & Vanderhye, P.C.

(57) ABSTRACT

A light emitting element of the present invention includes an electrode substrate; a thin-film electrode; and an electron acceleration layer sandwiched between the electrode substrate and the thin-film electrode. In the electron acceleration layer, as a result of a voltage applied between the electrode substrate and the thin-film electrode, electrons are accelerated so as to be turned into hot electrons. The hot electrons excite surfaces of the silicon fine particles contained in the electron acceleration layer so that the surfaces of the silicon fine particles emit light. Such a light emitting element of the present invention is a novel light emitting element, which has not been achieved by the conventional techniques. That is, the light emitting element of the present invention is able to (i) be produced by using a silicon material, which is available at low price, through a simple production method, and (ii) efficiently emit light.

17 Claims, 5 Drawing Sheets

U.S. PATENT DOCUMENTS

| | | |
|---|---|---|
| 2004/0021434 A1 | 2/2004 | Yoneda |
| 2004/0197943 A1 | 10/2004 | Izumi |
| 2004/0246408 A1 | 12/2004 | Ando |
| 2006/0061967 A1 | 3/2006 | Kim et al. |
| 2006/0152138 A1 | 7/2006 | Hori et al. |
| 2006/0186786 A1 | 8/2006 | Iwamatsu et al. |
| 2006/0290291 A1 | 12/2006 | Aizawa |
| 2010/0278561 A1 | 11/2010 | Kanda |
| 2010/0307724 A1 | 12/2010 | Ichii et al. |

FOREIGN PATENT DOCUMENTS

| | | |
|---|---|---|
| CN | 1849673 A | 10/2006 |
| EP | 1 617 449 | 1/2006 |
| EP | 1 617 450 A2 | 1/2006 |
| EP | 1 635 369 | 3/2006 |
| JP | 60-20027 A | 2/1985 |
| JP | 62-172631 | 7/1987 |
| JP | 1-107440 A | 4/1989 |
| JP | 1-149335 A | 6/1989 |
| JP | 1-279557 | 11/1989 |
| JP | 6-255168 A | 9/1994 |
| JP | 8-97582 A | 4/1996 |
| JP | 8-250766 A | 9/1996 |
| JP | 9-007499 A | 1/1997 |
| JP | 9-252068 A | 9/1997 |
| JP | 10-121042 | 5/1998 |
| JP | 10-308164 A | 11/1998 |
| JP | 10-308165 | 11/1998 |
| JP | 11-251069 A | 9/1999 |
| JP | 2000-76986 A | 3/2000 |
| JP | 2000-311640 | 11/2000 |
| JP | 2001-68012 A | 3/2001 |
| JP | 2001-195973 A | 7/2001 |
| JP | 2001-357961 | 12/2001 |
| JP | 2002-93310 A | 3/2002 |
| JP | 2002-208346 A | 7/2002 |
| JP | 2002-279892 A | 9/2002 |
| JP | 2003-115385 | 4/2003 |
| JP | 2003-173744 A | 6/2003 |
| JP | 2003-173878 A | 6/2003 |
| JP | 2003-331712 | 11/2003 |
| JP | 2004-241161 | 8/2004 |
| JP | 2004-253201 A | 9/2004 |
| JP | 2004-296781 | 10/2004 |
| JP | 2004-296950 | 10/2004 |
| JP | 2004-327084 A | 11/2004 |
| JP | 2005-190878 A | 7/2005 |
| JP | 2005-209396 A | 8/2005 |
| JP | 2005-326080 A | 11/2005 |
| JP | 2006-054162 | 2/2006 |
| JP | 2006-100758 A | 4/2006 |
| JP | 2006-190545 A | 7/2006 |
| JP | 2006-236964 | 9/2006 |
| JP | 2007-290873 | 11/2007 |
| JP | 2009-146891 A | 7/2009 |
| JP | 4314307 B1 | 8/2009 |
| JP | 2010-267492 A | 11/2010 |
| WO | 2005/004545 A1 | 1/2005 |
| WO | WO 2009/066723 | 5/2009 |

OTHER PUBLICATIONS

Ionic winds for locally enhanced cooling, David B. Go, Suresh V. Garimella, and Timothy S. Fisher, J. Appl. Phys., 102, 053302 (2007).

Yamaguchi and three others, "Development of Highly Efficient Electron-Beam Source by Use of Carbon Nanotube for Image Recording", Collected Papers of Japan Hardcopy 97, The Imaging Society of Japan, p. 221-224, Jul. 1997 (with partial English translation).

U.S. Appl. No. 12/695,381, Nagaoka et al., filed Jan. 28, 2010.
U.S. Appl. No. 12/696,905, Imura et al., filed Jan. 29, 2010.
U.S. Appl. No. 12/698,342, Hirakawa et al., filed Feb. 2, 2010.
U.S. Appl. No. 12/698,435, Hirakawa et al., filed Feb. 2, 2010.
U.S. Appl. No. 12/699,349, Iwamatsu et al., filed Feb. 3, 2010.

Naoi et al., "TiO2 Films Loaded with Silver Nanoparticles: Control of Multicolor Photochromic Behavior", J. Am. Chem. Soc., vol. 126, No. 11, pp. 3664-3668, (2004).

U.S. Appl. No. 12/781,997, filed May 18, 2010, entitled "Electron Emitting Element, Electron Emitting Device, Charging Device, Image Forming Apparatus, Electron-Beam Curing Device, Light Emitting Device, Image Display Device, Air Blowing Device, and Cooling Device" (not yet published).

U.S. Appl. No. 12/782,102, filed May 18, 2010, entitled "Electron Emitting Element, Electron Emitting Device, Light Emitting Device, Image Display Device, Air Blowing Device, Cooling Device, Charging Device, Image Forming Apparatus, and Electron-Beam Curing Device".

Yamaguchi et al, "Development of Highly Efficient Electron-Beam Source by Use of Carbon Nanotube for Image Recording", Collected Papers of Japan Hardcopy 97, The Imaging Society of Japan, Jul. 1997, pp. 221-224.

U.S. Appl. No. 12/940,546, filed Nov. 5, 2010, entitled "Heat Exchanger".

Electrophotography-Bases And Applications (1998; P. 213), The Society of Electrophotography of Japan, Corona Publishing Co., Ltd. (with partial English translation).

Rectangular Waveform of AC voltage

FIG. 6 (b)

Waveform of AC voltage (Rectangular Wave)
on which DC voltage is Superimposed

LIGHT EMITTING ELEMENT, LIGHT EMITTING DEVICE, IMAGE DISPLAY DEVICE, METHOD OF DRIVING LIGHT EMITTING ELEMENT, AND METHOD OF PRODUCING LIGHT EMITTING ELEMENT

This Nonprovisional application claims priority under 35 U.S.C. §119(a) on Patent Application No. 2009-121457 filed in Japan on May 19, 2009, the entire contents of which are hereby incorporated by reference.

TECHNICAL FIELD

The present invention relates to (i) a light emitting element including silicon fine particles which emit light in response to a voltage applied and (ii) a method of producing a light emitting element.

BACKGROUND ART

Recently, various studies have shown that silicon fine particles, i.e., so-called nanosilicons, have unique characteristics which cannot be achieved by silicon crystal. The most typical characteristic is a light-emitting characteristic. The nanosilicons, which have the light-emitting characteristic but are made of an environmentally-friendly material, have been attracting attention as an environmentally-friendly light-emitting material. In light emission of the nanosilicons, a size effect of silicon particles is essential. That is, the nanosilicons emit light when radiative recombination of electrons and electron holes is caused by excitation. Well-known light emission modes involving the excitation are the following four modes: photoluminescence induced by photoexcitation, cathodoluminescence induced by electron beam irradiation to a substance, electroluminescence induced by a directly-injected electrical current, and thermoluminescence induced by heat.

As for a photoluminescence element, for example, Patent Literature 1 discloses a technique which makes use of a light-emitting characteristic of the silicone fine particles themselves. According to the technique, a light-emitting element is made in such a manner that (i) silicon fine particles in a form of three-dimensional web are obtained by irradiating a silicon target with a laser and then (ii) the silicon fine particles are encapsulated into thermosetting silicon. The silicon fine particles in the form of three-dimensional web were found to emit blue light of 467 nm when being subjected to 300-nm excitation light under a 77 K environment.

Further, for example, Patent Literature 2 discloses a technique of obtaining white light by modifying, with an organic matter, a surface of each of the silicon fine particles so as to broaden a photoluminescence spectrum. According to the technique, a light emitting element is obtained by modifying, with a hydrocarbon group, the surface of each of the silicon fine particles so as to shape the each of the silicon fine particles into a pellet form. Such a light emitting element emits white light in response to excitation light, which is emitted by an ultraviolet LED serving as an excitation light source.

As for an electroluminescence element or a cathodoluminescence element, for example, Patent Literature 3 discloses a light emitting element employing nanosilicons which are obtained by anodizing crystal silicon. According to this light emitting element, light of any wavelength, from infrared light to ultraviolet light, is emitted in such a manner that hot electrons (ballistic electrons), which serve as carriers and are obtained in an electron drift layer including nanosilicons, excite a light emitting layer (electron drift layer) made by depositing the nanosilicons. Further, for example, Patent Literature 4 discloses a method of producing a light emitting element, which employs similar nanosilicons as above, by carrying out a high-frequency sputtering method in combination with an annealing treatment. According to the techniques of Patent Literatures 3 and 4, a size of each of the nanosilicon fine particles is an important factor for achieving multicolor light emission. That is, the light emitted turns red, green, and/or blue, i.e., three primary colors of light, depending on the size of each of the nanosilicon fine particles.

Further, for example, Patent Literature 5 discloses a display device employing a cathodoluminescence element.

CITATION LIST

Patent Literatures
  Patent Literature 1
  Japanese Patent Application Publication, Tokukaihei, No. 10-121042 A (Publication Date: May 12, 1998)
  Patent Literature 2
  Japanese Patent Application Publication, Tokukai, No. 2007-290873 A (Publication Date: Nov. 8, 2007)
  Patent Literature 3
  Japanese Patent Application Publication, Tokukai, No. 2004-296950 A (Publication Date: Oct. 21, 2004)
  Patent Literature 4
  Japanese Patent Application Publication, Tokukai, No. 2004-296781 A (Publication Date: Oct. 21, 2004)
  Patent Literature 5
  Japanese Patent Application Publication, Tokukaisho, No. 62-172631 A (Publication Date: Jul. 29, 1987)

SUMMARY OF INVENTION

Technical Problem

However, according to the photoluminescence element such as that disclosed in Patent Literature 1 or 2, high-energy excitation light is additionally required so as to obtain visible light or white light. This is because the silicon fine particles themselves cannot emit light without light excitation. It is worth developing an element of emitting white light as long as the element efficiently emits white light. However, generally, a light emitting element, which is used for generating the excitation light of high-energy wavelength, needs to include noble metal. This makes it difficult to make good use of an advantageous characteristic of a material of the silicon.

Further, the electroluminescent element or the cathodoluminescence element such as those disclosed in Patent Literature 3, 4, or 5 still has the following problems. Specifically, for example, in order to produce such electroluminescent element or cathodoluminescence element, a large amount of energy is required because (i) the nanosilicons have to be supported by a monocrystalline silicon substrate or a multicrystalline silicon substrate and (ii) the nanosilicons are grown on a substrate so that each of the nanosilicons has an intended size. Moreover, in order to achieve a light emitting element including silicon fine particles which emit light in response to a voltage applied, it is required to employ a carrier injection-type electroluminescent element. However, according to this configuration, in order to obtain white light, it is important to control the size and dispersion condition of the nanosilicon fine particles. Therefore, it is extremely difficult to produce, at low cost, especially a light emitting element having a large surface and emitting light uniformly.

As described above, the conventional light emitting elements, each employing the nanosilicons, cannot achieve efficient light emission at low cost through a simple production method.

The present invention has been made in view of the problems, and an object of the present invention is to provide (i) a novel light emitting element that is able to (a) be produced by a silicon material, which is available at a low price, through a simple production method and (b) efficiently emit light, and (ii) a method of producing a novel light emitting element.

Solution to Problem

In order to attain the above object, a light emitting element of the present invention includes: an electrode substrate; a thin-film electrode; and an electron acceleration layer sandwiched between the electrode substrate and the thin-film electrode, the electron acceleration layer containing (i) silicon fine particles and (ii) at least one of conductive fine particles and a basic dispersant, as a result of a voltage applied between the electrode substrate and the thin-film electrode, electrons being accelerated in the electron acceleration layer so as to be turned into hot electrons, and the hot electrons exciting surfaces of the silicon fine particles contained in the electron acceleration layer so that the surfaces of the silicon fine particles emit light.

ADVANTAGEOUS EFFECTS OF INVENTION

According to the configuration, there is provided, between the electrode substrate and the thin-film electrode, the electron acceleration layer including (i) the silicon fine particles and (ii) at least one of (a) the conductive fine particles and (b) the basic dispersant. This electron acceleration layer is a thin-film layer including (i) the silicon fine particles and (ii) at least one of (a) the conductive fine particles and (b) the basic dispersant, which are densely aggregated. The electron acceleration layer has a semiconductive property. When a voltage is applied between the electrode substrate and the thin-film electrode, an intense electrical field is generated in an edge portion of the thin-film electrode. Accordingly, an electrical current preferentially passes through the edge portion of the thin-film electrode. A part of electrons in the electrical current become hot electrons (ballistic electrons) or quasi-ballistic electrons due to the intense electric field. Then, part of the hot electrons or the quasi-ballistic electrons cause electron beam excitation of a luminescence center, which is on a surface of each of the silicon fine particles. In this way, a luminous phenomenon is caused.

Here, in a case where the electron acceleration layer contains the basic dispersant, it is considered that an electron pair donor that donates a pair of electrons, included in the basic dispersant, causes the hot electrons (ballistic electrons) or quasi-ballistic electrons to be generated. That is, the basic dispersant includes the electron pair donor that donates a pair of electrons, and the electron pair donor is ionized after donating the pair of electrons. It is considered that the ionized electron pair donor transfers electric charge on a surface of each of the silicon fine particles to which the electron pair donor is attached, thereby allowing electric conduction on the surface of each of the silicon fine particles. Then, part of electrons of an electrical current passing through the surface of each of the silicon fine particles turn into the hot electrons (ballistic electrons) or quasi-ballistic electrons, in an area, of the electron acceleration layer, in which the intense electrical field is generated.

It is possible that the luminescence center, which is on the surface of each of the silicon fine particles, is a so-called color center. However, the luminescence center is created probably as a result of a defect level that results from a structural defect of silicon oxide constituting the silicon fine particles, or of an impurity level associated with an additive.

According to the light emitting element of the present invention, it is possible to cause the silicon fine particles themselves to efficiently emit light by employing a simple configuration which has not been achieved by the conventional techniques. The simple configuration here refers to the electron acceleration layer, which includes (i) the silicon fine particles and (ii) at least one of the conductive fine particles and the basic dispersant. Further, it is possible to form the light emitting element in which the silicon fine particles themselves emit light, through a simple production method whereby to form, by using the silicon fine particles, the electron acceleration layer including (i) the silicon fine particles and (ii) at least one of the conductive fine particles and the basic dispersant.

As described above, a light emitting element of the present invention is a novel light emitting element, which has not been achieved by the conventional techniques. The light emitting element of the present invention is able to (i) be produced by using a silicon material, which is available at low price, through a simple production method, and (ii) efficiently emit light.

BRIEF DESCRIPTION OF DRAWINGS

FIG. 1

FIG. 2

FIG. 3

FIG. 4(a)

FIG. 4(b)

FIG. 4(c)

FIG. 4(d)

FIG. 5

FIG. 6(a)

FIG. 6(b)

DESCRIPTION OF EMBODIMENTS

The following specifically explains Embodiments and Examples of a light emitting element of the present invention, with reference to FIGS. 1 to 6. Note that Embodiments and Examples described below are merely specific examples of the present invention and by no means limit the present invention.

Embodiments (Configuration of Element)

Figure 1:
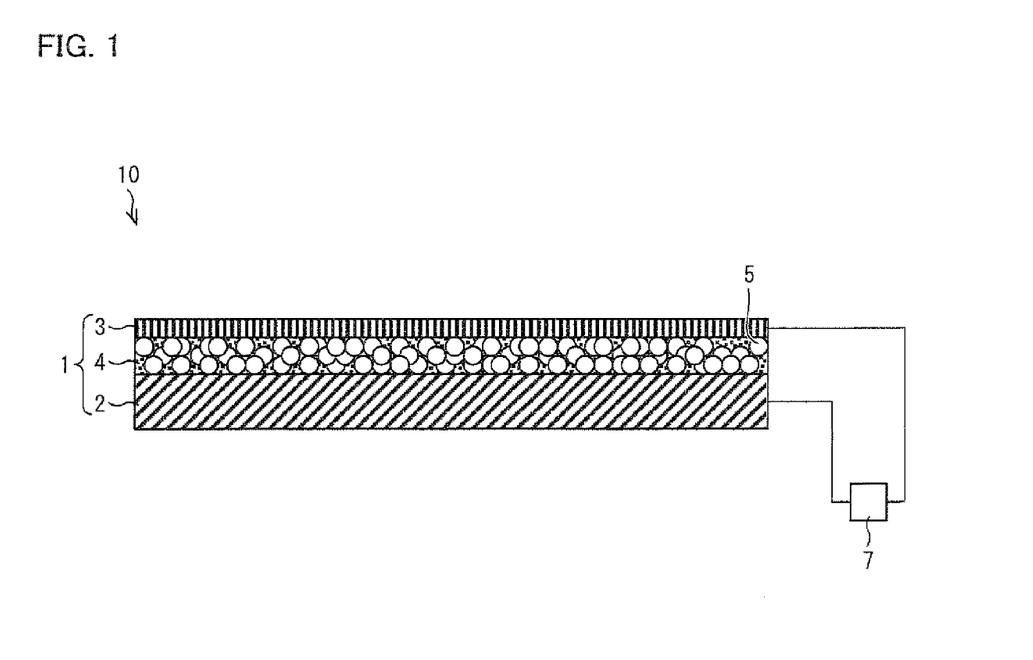
FIG. 1 schematically illustrates a configuration of a light emitting element of an embodiment of the present invention.

FIG. 1 is a schematic view illustrating a configuration of a light emitting device 10 including a light emitting element 1 according to one embodiment of the present invention. As shown in FIG. 1, the light emitting device 10 includes the light emitting element 1 according to one embodiment of the present invention, and a power supply 7. As shown in FIG. 1, the light emitting element 1 includes: an electrode substrate 2 as a lower electrode; a thin-film electrode 3 as an upper electrode; and an electron acceleration layer 4 sandwiched therebetween. Further, the electrode substrate 2 and the thin-film electrode 3 are connected to a power supply 7, so that a voltage can be applied between the electrode substrate 2 and the thin-film electrode 3 which are provided facing each other.

According to the light emitting element 1, light is emitted in the following manner. First, in response to a voltage applied between the electrode substrate 2 and the thin-film electrode 3, an electrical current passes between the electrode substrate 2 and the thin-film electrode 3. That is, the electrical current passes through the electron acceleration layer 4. Part of electrons of the electrical current turn into hot electrons or quasi-ballistic electrons, due to an intense electrical field generated inside the electron acceleration layer 4 in response to the voltage applied. The hot electrons or the quasi-ballistic electrons cause electron beam excitation of a luminescence center on a surface of each of silicon fine particles 5, which are contained in the electron acceleration layer 4. In this way, light is emitted.

The electrode substrate 2 serving as the lower electrode also acts as a supporting member of the light emitting element. Accordingly, the electrode substrate 2 is not specifically limited in material as long as the material has a sufficient strength, excellent adhesiveness with respect to a substance in direct contact with the material and sufficient conductivity. Examples of the electrode substrate include: metal substrates made of, for example, SUS, Ti, and Cu; semiconductor substrates made of, for example, Si, Ge, and GaAs; insulator substrates such as a glass substrate; and plastic substrates. In cases where an insulator substrate such as a glass substrate is used, a conductive material such as metal is attached, as an electrode, to an interface of the insulator substrate and the electron acceleration layer 4 so that the insulator substrate can be used as the electrode substrate 2 that serves as the lower electrode. A constituent material of the conductive material is not specifically limited as long as a thin film of a material excellent in conductivity can be formed by magnetron sputtering or the like. Note that, if a steady operation of the light emitting element in the atmosphere is desired, a conductor having high resistance to oxidation is preferably used and noble metal is more preferably used for the constituent material. An ITO thin-film which is widely used as a conductive oxide material for a transparent electrode is also applicable. Alternatively, it is possible to use a metal thin film obtained by first forming a Ti film of 200 nm on a surface of a glass substrate and then forming a Cu film of 1000 nm on the Ti film, because a strong thin film can be formed. In this case, materials and values are not specifically limited to those described above.

The thin-film electrode 3 is for applying a voltage in the electron acceleration layer 4. Accordingly, a material of the thin-film electrode 3 is not specifically limited as long as the material makes it possible to apply a voltage. Examples of such a material include: gold, silver, carbon, tungsten, titanium, aluminum, and palladium. Among these materials, in particular, in consideration of an operation under an atmospheric pressure, the best material is gold which is free from oxide or sulfide formation reaction. Further, silver, palladium, or tungsten, which has a relatively small oxide formation reaction, is also applicable material that can be used without any problem.

The thin-film electrode 3 can have any film thickness as long as the thin-film electrode 3 functions as an electrode. For example, it is preferable that the thin-film electrode 3 have a film thickness of 10 nm or greater. In a case where light is emitted by the light emitting element 1 through the thin-film electrode 3, the thin-film electrode 3 is preferably thinner. On the other hand, in a case where light is emitted by the light emitting element 1 through the electrode substrate 2, the thin-film electrode 3 is not limited in terms of its property as long as it has good conductivity. In the case where light is emitted through the electrode substrate 2, the electrode substrate 2 is preferably, for example, a transparent substrate. Moreover, in a case where the thin-film electrode 3 has a porous structure as described below, the thin-film electrode 3 does not need to have a film thickness that allows light to transmit therethrough. This is because, in the case of the thin-film electrode 3 having the porous structure, light is emitted especially from edge portions of the thin-film electrode 3.

In the case where the thin-film electrode 3 has the porous structure, a lot of edge portions are formed around pores of the thin-film electrode 3. In these edge portions, the electrical field becomes intense. That is, the thin-film electrode 3 having the porous structure has a lot of areas, in each of which the electrical field is intense and thus the hot electrons are efficiently generated. Accordingly, it is possible to surely provide points where the hot electrons are generated, thereby obtaining a lot of light emission points provided all over the thin-film electrode. As such, the light-emitting element 1 emits an increased, amount of light.

In the case where light is emitted by the light emitting element 1 through the electrode substrate 2, the electrode substrate 2 can be configured so as to have the porous structure.

Figure 2:
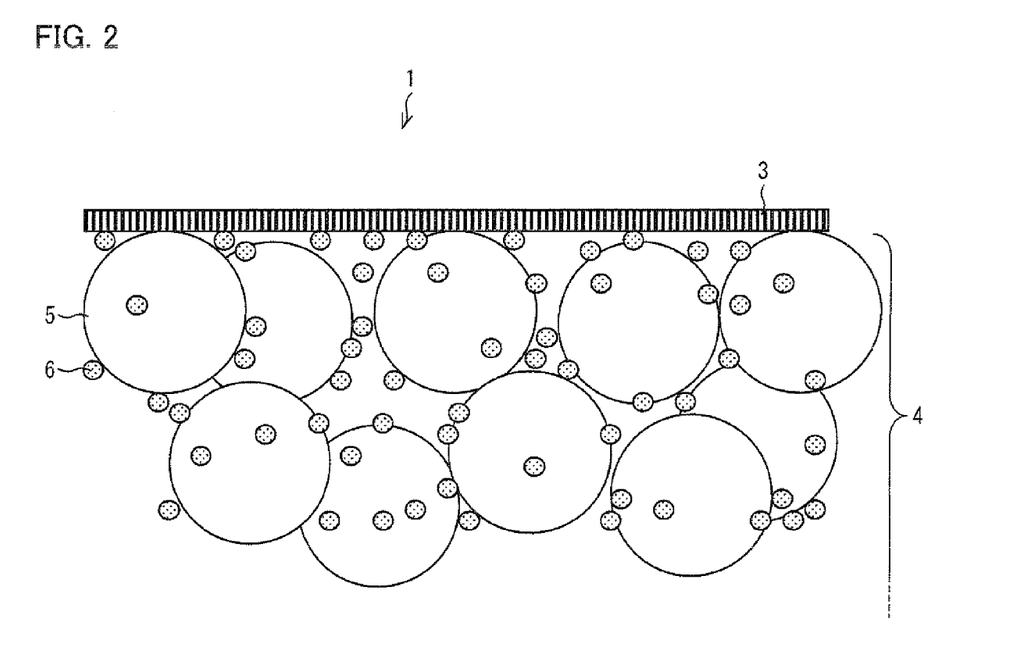
FIG. 2 is an enlarged view schematically illustrating an electron acceleration layer and members surrounding the electron acceleration layer in the light emitting element of the embodiment of the present invention.
Figure 3:
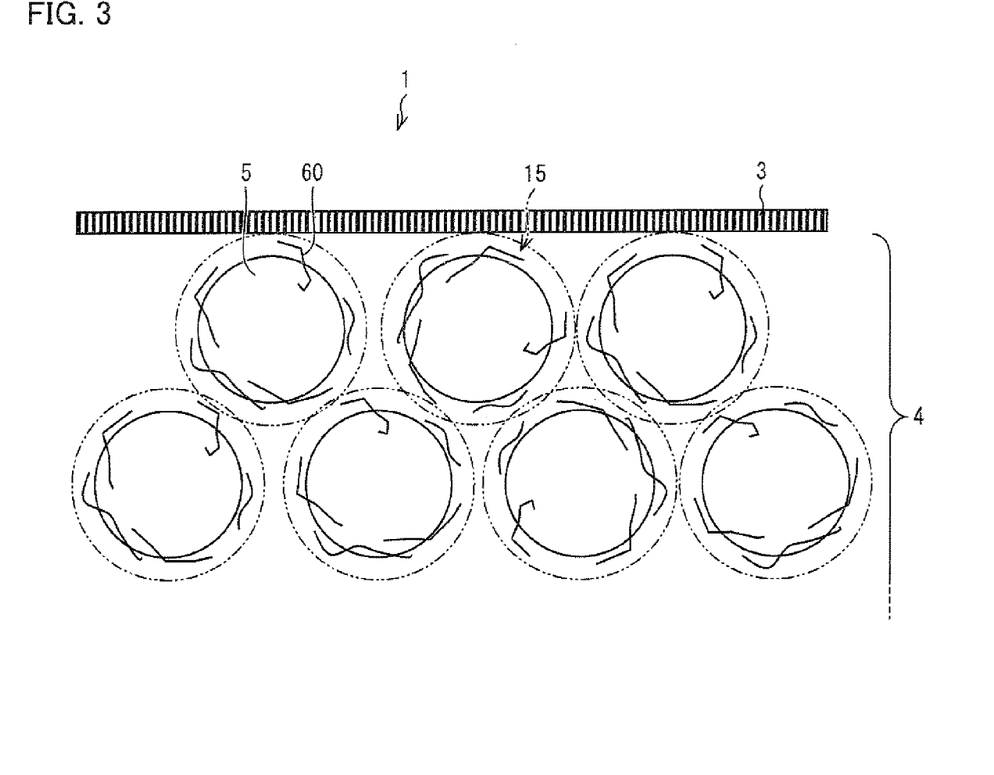
FIG. 3 is an enlarged view schematically illustrating another electron acceleration layer and members surrounding the another electron acceleration layer in a light emitting element of an embodiment of the present invention.
Figure 4:
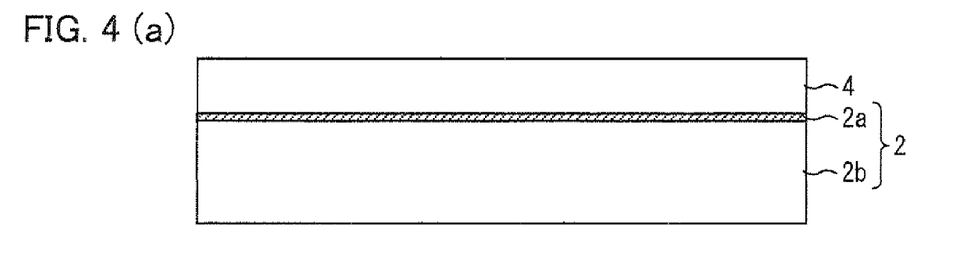
FIG. 4(a), indicating a process of forming a porous thin-film electrode, illustrates an electron acceleration layer 4 being formed on an electrode substrate.
FIG. 4(b), indicating the process of forming the porous thin-film electrode, illustrates mask particles being applied on the electron acceleration layer.
FIG. 4(c), indicating the process of forming the porous thin-film electrode, illustrates a material of the thin-film electrode being applied on the mask particles.
FIG. 4(d), indicating the process of forming the porous thin-film electrodes, illustrates the porous thin-film electrode from which the mask particles have been removed.

FIGS. 2 and 3 are enlarged views schematically illustrating the electron acceleration layer 4 of the light emitting element 1 and members surrounding the electron acceleration layer 4. As illustrated in FIG. 2, the electron acceleration layer 4 includes (i) the silicon fine particles 5 and (ii) the conductive fine particles 6. As an alternative, as illustrated in FIG. 3, the electrode acceleration layer 4 includes (a) the silicon fine particles 5 and (b) the basic dispersant 60 that prevents the silicon fine particles 5 from aggregating in a solvent so that the silicon fine particles 5 are dispersed in the solvent. It is needless to say that the electron acceleration layer 4 may include the silicon fine particles 5, the conductive fine particles 6, and the basic dispersant 60.

An average particle diameter of the silicon fine particles 5 is preferably within a range of 12 nm to 110 nm. In this case, a particle diameter distribution of the silicon fine particles 5 may be broad with respect to the average particle diameter. If the average particle diameter of the silicon fine particles is too small, then the silicon fine particles are difficult to be dispersed because force between the particles is strong and thus the particles are likely to aggregate. On the other hand, if the average particle diameter of the silicon fine particles is too large, then the silicon fine particles are well dispersed. However, in this case, it is difficult to adjust (i) the film thickness of the electron acceleration layer 4 so as to adjust resistance and (ii) a mixing rate of at least one of the conductive fine particles 6 and the basic dispersant 60. The silicon fine particles 5 can be made up of two or more types of particles, or can be made up of two or more types of particles having different particle diameter peaks. Alternatively, the silicon fine particles 5 can be made up of particles of one type whose particle diameter distribution is broad.

In a case where the electron acceleration layer 4 contains the conductive fine particles 6, it is preferable that the silicon fine particles 5 be contained by 80 wt % to 95 wt % with respect to a total weight of particles constituting the electrode acceleration layer 4.

The following description deals with the conductive fine particles 6, which are contained in the electron acceleration layer 4 of the light emitting element 1. The conductive fine particles 6 can be made of any kind of conductor, in view of an operation principle for generating ballistic electrons. However, if the material is a conductor having high resistance to oxidation, oxidation degradation at the time of an operation under the atmospheric pressure can be prevented. In this patent application, to have high resistance to oxidation means to have a small oxide formation reaction. In general, according to a thermodynamic calculation, when a value of a change $\Delta G$ [kJ/mol] in free energy of oxide formation is negative and greater, the oxide formation reaction occurs more easily.

Examples of the conductor that has high resistance to oxidation are noble metal such as gold, silver, platinum, palladium, and nickel. The conductive fine particles 6 can be produced by using a known fine particle production method such as a sputtering method or a spray heating method. It is also possible to use commercially available metal fine particle powder such as silver nanoparticles manufactured and marketed by Applied Nano Particle Laboratory Co. A principle of generating ballistic electrons will be described later.

In the present embodiment, because control of electric conductivity is required, an average particle diameter of the conductive fine particles 6 has to be smaller than that of the silicon fine particles 5. The conductive fine particles 6 preferably have an average particle diameter in a range of 3 nm to 10 nm, In a case where, as described above, the average particle diameter of the conductive fine particles 6 is arranged to be smaller than that of the silicon fine particles 5 and preferably in a range of 3 nm to 10 nm, a conductive path made of the conductive fine particles 6 is not formed in the electron acceleration layer 4. As a result, dielectric breakdown becomes difficult to occur in the electron acceleration layer 4. The principle has a lot of unexplained points; however, the hot electrons are efficiently generated by use of the conductive fine particles 6 whose average particle diameter is within the above range.

Note that each of the conductive fine particle 6 may be surrounded by a small insulating material that is an insulating material whose size is smaller than the conductive fine particle 6. This small insulating material can be an adhering substance which adheres to a surface of the conductive fine particle 6. Further, the adhering substance may be an insulating coating film that coats the surface of the conductive fine particle 6 and that is made as an aggregate of particles whose average particle diameter is smaller than that of the conductive fine particle 6. In view of the operation principle for generating hot electrons, any insulating material can be used as the small insulating material. However, in a case where the small insulating material is the insulating coating film coating the surface of the conductive fine particle 6 and an oxide film of the conductive fine particle 6 is used as the insulating coating film, a thickness of the oxide film may be increased to a thickness larger than a desired thickness due to oxidation degradation in the atmosphere. For the purpose of preventing the oxidation degradation at the time of an operation under the atmospheric pressure, the insulating coating film is preferably made of an organic material. Examples of the organic material include: alcoholate, aliphatic acid, and alkanethiol. A thinner insulating coating film is more advantageous.

The following description discusses a principle of light emission of the light emitting element which includes the electron acceleration layer 4 containing the conductive fine particles 6. FIG. 2 is an enlarged view illustrating the electron acceleration layer 4 and members surrounding the electron acceleration layer 4 of the light emitting element 1. As illustrated in FIG. 2, the electron acceleration layer 4 is made mainly of the silicon fine particles 5. Besides the silicon fine particles 5, the conductive fine particles 6 are dispersed in gaps between the silicon fine particles 5. The electron acceleration layer is semi-conductive because the electron acceleration layer 4 contains the silicon fine particles 5 and a small number of the conductive fine particles 6. Therefore, the electron acceleration layer 4 allows an extremely weak electrical current to pass therethrough in response to a voltage applied to the electron acceleration layer 4. A volt-ampere characteristic of the electron acceleration layer 4 shows a characteristic which is similar to a so-called varistor characteristic, and a current value sharply increases as an applied voltage increases. A part of electrons in the current become hot electrons or quasi-ballistic electrons due to an intense electric field formed within the electron acceleration layer 4 by the applied voltage. The hot electrons or the quasi-ballistic electrons cause electron beam excitation of a luminescence center on a surface of each of the silicon fine particles 5, which are contained in the electron acceleration layer 4. In this way, light is emitted. A generation process of the hot electrons or the quasi-ballistic electrons has not been determined, but it is considered that the electrons are generated by simultaneous acceleration and tunneling of electrons in a direction of an electric field.

Although its principle is still under study, a color of the light emitted was found to be different depending on a type of at least one of the conductive fine particles 6 and the basic dispersant 60, which are/is to be added to the silicon fine particles 5. For example, in a case of using (i) silicon fine particles 5 whose average particle diameter was 50 nm and particle diameter distribution was from 4 nm to 200 nm and (ii) silver fine particles serving as the conductive fine particles 6, the electron acceleration layer (fine particle layer) emitted light of red, green and blue, i.e., three primary colors of light. That is, the electron acceleration layer as a whole emitted white light.

A principle of emission of the white light is still under study, and thus it is not possible to provide a concrete description at present. However, it would be helpful to refer to a publicly known literature (K. Naoi, Y. Ohko, and T. Tatsuma "TiO2 Films Loaded with Silver Nanoparticles: Control of Multicolor Photochromic Behavior" J. Am. Chem. Soc., 126, 3664-3668 (2004).) According to photochromism (a phenomenon that a color of a material reversibly changes by light irradiation) of nanometer-scale silver fine particles (silver nanoparticles) disclosed in the above public known literature, the silver nanoparticles have a light-absorbing characteristic that depends on their particle diameter, shape, and dielectric constant. Broadening distributions of the particle diameter, shape, and dielectric constant makes it possible to achieve a light-absorbing characteristic which covers a broad range, i.e., an entire range, of visible light. This suggests that the nanometer-scale silver fine particles, which have the broadly distributed particle diameter, shape, and dielectric constant, include an intermediate level corresponding to the entire range of the visible light. That is, the white light was obtained because probably of electron beam excitation of the intermediate level of the silver fine particles.

Further, in a case of using (i) the silicon fine particles 5 whose average particle diameter was 50 nm and particle diameter distribution was from 4 nm to 200 nm and (ii) the basic dispersant 60, the electron acceleration layer 4 emitted light of orange. The light of orange was emitted because probably of electron beam excitation of the intermediate level, which was associated with a publicly-known structural defect of silicon oxide.

The light emitting element 1 has a capacitance component, because the light emitting element 1 has a capacitor structure of a parallel plate type. Therefore, if a direct-current voltage is continuously applied to the light emitting element 1, then an anti-electrical field is formed inside a silicon fine particle layer, which is a conductive material. Accordingly, an electron acceleration electrical field, which is required for generating the hot electrons, may be absorbed by the anti-electrical field. However, application of a pulsed voltage between the electrode substrate 2 and the thin-film electrode 3 makes it possible to prevent the electron acceleration electrical field from being absorbed by the anti-electrical field, so as to keep large amount of light being emitted from the silicon fine particles and to reduce variation in the amount of light emitted. Accordingly, in a light emitting element driving method for driving the light emitting element 1, the pulsed voltage can be applied between the electrode substrate 2 and the thin-film electrode 3.

Figure 5:
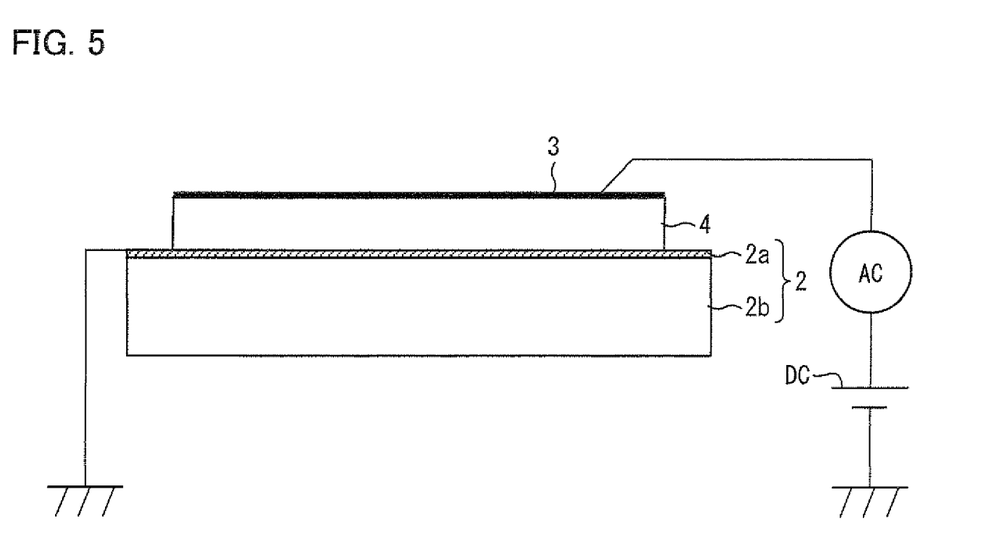
FIG. 5 illustrates a measurement system of a light emission experiment.
Figure 6A:
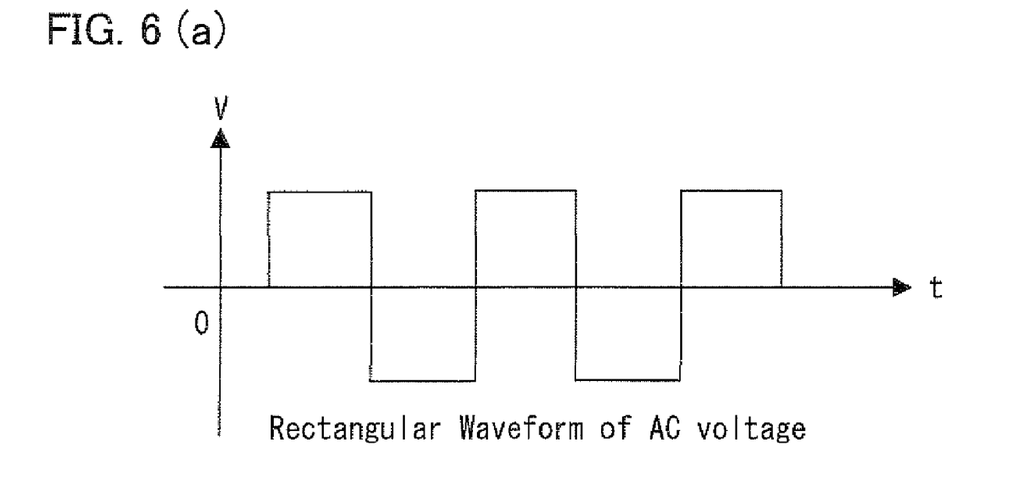
FIG. 6(a) is a graph illustrating waveform obtained when an alternating-current voltage is applied.
Figure 6B:
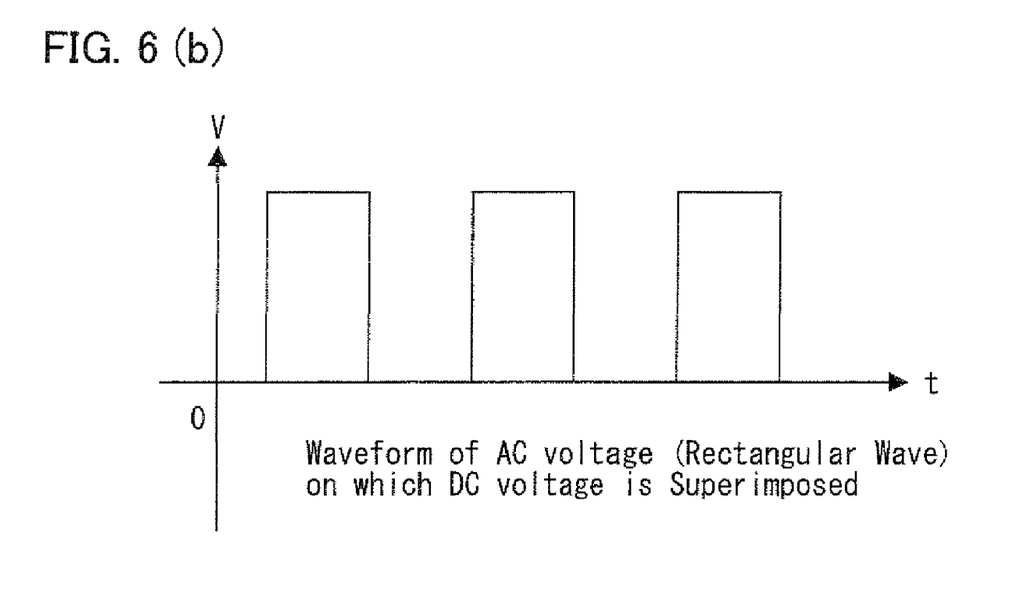
FIG. 6(b) is a graph illustrating waveform obtained when an alternating-current voltage, on which a direct-current voltage is superimposed, is applied.

FIG. 5 is a diagram indicating that a pulsed voltage is applied between the electron substrate 2 and the thin-film electrode 3. According to FIG. 5, the electrode substrate 2 includes (i) an insulation substrate 2b and (ii) a conductive material 2a which serves as an electrode and is attached to the insulation substrate 2b. FIGS. 6(a) and 6(b) each illustrate an waveform of a voltage applied. FIG. 6(a) illustrates the waveform (rectangular wave) obtained when an alternate-current voltage is applied, while FIG. 6(b) illustrates the waveform obtained when an alternate-current voltage (rectangular wave), on which a direct-current voltage is superimposed, is applied. Although waves illustrated in FIGS. 6(a) and 6(b) are rectangular waves, the waves may be sine waves. Note however that the rectangular waves are preferable, because light emission tends to become more intense as a rising edge of the voltage becomes more precipitous.

The following description deals with the basic dispersant 60, which is contained in the electron acceleration layer 4 of the light emitting element. In the present invention, the basic dispersant 60 has functions as follows: (i) a primary function as a dispersant that successfully disperses, in a solvent, the silicon fine particles 5 that easily cohere to one another, thereby realizing formation of a very smooth fine particle layer (electron acceleration layer 4) on a surface of the electrode substrate 2; and (ii) an additional function that allows electrical conduction on surfaces of the silicon fine particles 5.

The basic dispersant 60 includes a polymer and an electron pair donor that is introduced into a part of the polymer. The polymer provides dispersibility due to its steric repulsion effect. In FIG. 3, a referential numeral 15 indicates a region where a steric hindrance formed between the silicon fine particles 5 is caused. The electron pair donor functions as an anchor that adsorbs to the silicon fine particle 5. Further, after donating a pair of electrons, the electron pair donor becomes a positive ion, thereby allowing ion conduction. It is presumed that the function that allows electric conduction on the surfaces of the silicon fine particles 5 is caused because a part, in the basic dispersant 60, that allows the ion conduction transfers electric charge. Further, the ion conductive parts in the basic dispersant 60 electrically repulse one another, thereby contributing to the dispersion of the silicon fine particles 5.

An electron pair donating part is a specific substituent having an electron donating substituent, which may be, for example, a pi electron system, such as a phenyl group or a vinyl group, an alkyl group, an amino group, or the like.

Examples of commercially available products of the basic dispersant 60 that can be applied to the present invention encompass: products manufactured by Avecia K.K. (SOLSPERSE disperses, such as SOLSPERSE 9000, 13240, 13940, 20000, 24000, 24000GR, 24000SC, 26000, 28000, 32550, 34750, 31845, and the like); products manufactured by BYK chemie (DISPERBYK 106, 112, 116, 142, 161, 162, 163, 164, 165, 166, 181, 182, 183, 184, 185, 191, 2000, 2001); products manufactured by Ajinomoto Fine-Techno Co., Inc. (AJISPER PB711, PB411, PB111, PB821, PB822); and products manufactured by EFKA chemicals (EFKA-47, 4050).

A content of the basic dispersant 60 in the electron acceleration layer 4 is an important control factor, in terms of controlling an amount of light emitted, because the content relates to easiness in flow of current in the light emitting element, which is correlated with the emission amount of the hot electrons or the quasi-ballistic electrons.

Addition of the basic dispersant 60 to the electron acceleration layer 4 is carried out in course of dispersing, in a solvent, the silicon fine particles 5 to form the electron acceleration layer 4. That is, a necessary amount of the basic dispersant 60 is added to a solvent to be used and then dispersed in the solvent, so as to prepare a dispersant-containing solvent. Subsequently, the silicon fine particles 5 are added to the dispersant-containing solvent and then sufficiently dispersed in the dispersant-containing solvent so that the basic dispersant 60 adheres to the surfaces of the silicon fine particles 5. An amount of the dispersant adhering to the surfaces of the silicon fine particles 5 can be controlled by controlling an additive amount of the dispersant added to the solvent. However, the additive amount of the dispersant is not proportional to easiness in current flow in the electron acceleration layer 4, which is obtained after the dispersant is added. That is, the easiness in current flow has a peak at a point when the additive amount of the dispersant reaches a certain amount. In a case where the additive amount is insufficient, the number of electron carriers is insufficient, thereby resulting in that an amount of current flowing in the electron acceleration layer 4 is naturally small. On the other hand, in a case where the additive amount is excessive, a component of the polymer included in the basic dispersant 60 intensely works as a resistive component with respect to the current flowing in the element, thereby reducing a current value.

As such, there is an optimal value in the additive amount of the basic dispersant 60. The optimal value is set in view of the amount of current flowing in the element, and therefore depends on the situation. However, when the content of the basic dispersant 60 is represented as an additive amount of the basic dispersant 60 with respect to an amount of a solvent of a dispersion solution containing the silicon fine particles 5, under a condition where the dispersion solution is dropped onto the electrode substrate 2 and then subjected to spin coating so as to form the insulating layer, the basic dispersant 60 is contained in the solvent preferably by 0.4 wt % to 10 wt %, and more preferably by 1 wt % to 5 wt %. In a case where the basic dispersant 60 is contained in the solvent by less than 0.4 wt %, a sufficient amount of current flowing in the electron acceleration layer cannot be obtained, thereby resulting in that the light emitting element 1 may not emit electrons at all. In a case where the basic dispersant 60 is contained more preferably by not less than 1 wt %, it is possible to obtain stable electron emission from the light emitting element 1. On the other hand, in a case where the basic dispersant 60 is contained by more than 10 wt %, a resistive component of the polymer included in the basic dispersant 60 may cause the current in the element to be difficult to flow. This may cause decrease in hot electron emission or quasi-ballistic electron emission from the light emitting element 1. In a case where the basic dispersant is contained more preferably by not more than 5 wt %, it is advantageously possible to obtain hot electron emission or quasi-ballistic electron emission from the light emitting element 1 without any decrease in the emission amount of the hot electrons or the quasi-ballistic electrons.

The following description deals with a principle of the light emission of the light emitting element which includes the electron acceleration layer 4 containing the basic dispersant 60, with reference to FIG. 3 as above. As illustrated in FIG. 3, the electron acceleration layer 4 is made mostly of the silicon fine particles 5, and the basic dispersant 60 adheres to the surfaces of the silicon fine particles 5. This forms a region 15 where a steric hindrance is caused due to the basic dispersant 60 is formed on the surface of the silicon fine particle 5, thereby allowing the silicon fine particles 5 to be successfully dispersed in the solvent. Further, the silicon fine particles 5 have an insulating property. However, an ion conductive part of the basic dispersant 60 adhering to the surface of the silicon fine particle 5 transfers electric charge, thereby resulting in that the electron acceleration layer 4 has a semi-conductive property. Therefore, the electron acceleration layer 4 allows an extremely weak electrical current to pass therethrough in response to a voltage applied between the electrode substrate 2 and the thin-film electrode 3. A volt-ampere characteristic of the electron acceleration layer 4 shows a so-called varistor characteristic, and a current value sharply increases as an applied voltage increases. A part of electrons in the current become the hot electrons or quasi-ballistic electrons due to an intense electric field formed within the electron acceleration layer 4 by the applied voltage. The hot electrons or quasi-ballistic electrons cause electron beam excitation of the luminescence center on the surface of each of the silicon fine particles 5, which are contained in the electron acceleration layer 4. In this way, light is emitted. The luminescence center on the surface of each of the silicon fine particles is created probably as a result of a defect level that results from the structural defect of silicon oxide constituting the silicon fine particles. A generation process of the hot electrons or quasi-ballistic electrons has not been determined, but it is considered that these electrons are generated by simultaneous acceleration and tunneling of electrons in a direction of an electric field.

Further, (i) the silicon fine particles 5 and (ii) at least one of the conductive fine particles 6 and the basic dispersant 60 may be dispersed in binder resin. That is, the electron acceleration layer 4 may contain the binder resin. The binder resin may be any material, as long as the material has an insulating property and sufficient adhesiveness with respect to the electrode substrate 2 and the silicon fine particles 5 and the conductive fine particles 6 can be dispersed in the binder resin. The binder resin may be made of resin such as: tetramethoxysilane, tetraethoxysilane, methyltrimethoxysilane, methyltriethoxysilane, phenyltriethoxysilane, hexyltrimethoxysilane, decyltrimethoxysilane, hydrolysable group-containing siloxane, vinyltrimethoxysilane, vinyltriethoxysilane, 2-(3,4epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropyltrimethoxysilane, 3-methacryloxypropyltriethoxysilane, 3-acryloxypropyltrimethoxysilane, N-2-(aminoethyl)-3-aminopropyltrimethoxysilane, N-2-(aminoethyl)-3-aminopropyltriethoxysilne, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-ureidopropyltriethoxysilane, 3-chloropropyltrimethoxysilane, 3-mercaptopropyltrimethoxysilane, bis(triethoxysilylpropyl)tetrasulfide, and 3-isocyanatepropyltriethoxysilane. The above binder resin can be used solely or in combination of two or more kinds.

In a case where (i) the silicon fine particles 5 and (ii) at least one of the conductive fine particles 6 and the basic dispersant 60 are dispersed in the binder resin, the mechanical strength of the light emitting element 1 increases because the binder resin has (i) a high adhesiveness with respect to the electrode substrate 2 and (ii) a high mechanical strength. Further, in a case of forming the thin-film electrode 3 having a porous structure through for example the later-described method, in which (i) mask particles are applied on the electron acceleration layer 4, (ii) a material of the thin-film electrode is applied on the electron acceleration layer 4 masked with the mask particles, and then (iii) the mask particles are removed from the acceleration layer, the following occurs. If the electron acceleration layer 4 is weak in strength, then the electron acceleration layer 4 will be damaged when the mask particles are removed (by for example air blowing). However, provision of the binder resin to the electron acceleration layer 4 makes it possible to prevent the electron acceleration layer 4 from being damaged, because such an electron acceleration 4 containing the binder resin has an increased mechanical strength.

Further, in the case where (i) the silicon fine particles 5 and (ii) at least one of the conductive fine particles 6 and the basic dispersant 60 are dispersed in the binder resin, aggregation becomes hard to occur. Accordingly, performance of the light emitting element 1 becomes uniform, and steady hot electron generation becomes possible. As such, it is possible to achieve stable light emission. Further, in a case where the electron acceleration layer 4 contains the conductive fine particles 6, and further contains the binder resin, the binder resin surrounds the conductive fine particles 6. Accordingly, element degradation of the conductive fine particles 6 due to oxidation, which is caused by oxygen in the atmosphere, becomes less likely to occur. Therefore, the light emitting element 1 can be steadily operated not only in vacuum but also under the atmospheric pressure.

The thinner the electron acceleration layer 4 is, the more intense the electrical field becomes. That is, the thinner electron acceleration layer 4 is capable of exciting the silicon fine particles with a lower voltage. However, the film thickness of the electron acceleration layer 4 is preferably within a range of 700 nm to 1000 nm, because according to such an electron acceleration layer 4, it is possible to (i) uniformize the film thickness, and (ii) adjust resistance, in a film thickness direction, of the electron acceleration layer 4.

(Production Method)

The following explanation deals with an embodiment of a method for producing the light emitting element 1. First, (i) the silicon fine particles 5 and (ii) at least one of the conductive fine particles 6 and the basic dispersant 60 are dispersed into a dispersion solvent so as to obtain a fine particle dispersion solution A. The fine particle dispersion solution A can be obtained by, for example, dispersing the silicon fine particles 5 into the dispersion solvent, and then additionally dispersing the at least one of the conductive fine particles 6 and the basic dispersant 60 into the dispersion solvent. A dispersion method is not specifically limited. For example, the dispersion can be performed by use of an ultrasonic dispersion device at a normal temperature. The dispersion solvent used here is not specifically limited as long as (i) the silicon fine particles 5 and (ii) the at least one of the conductive fine particles 6 and the basic dispersant 60 can be dispersed in the dispersion solvent, and the dispersion solvent can be dried after application of the fine particle dispersion solution A. Examples of the dispersion solvent are: toluene, benzene, xylene, hexane, and tetradecane. In a case of employing the conductive fine particles 6, a surface of each of the conductive fine particles 6 is preferably pre-treated (e.g., treated with alcoholate) so as to improve its dispersibility.

In a case where the electron acceleration layer 4 contains the conductive fine particles 6 and further contains the binder resin, the following processes are carried out. First, a dispersion solution B is obtained by dispersing the silicon fine particles 5 and the binder resin into a dispersion solvent. The dispersion solvent used here is not specifically limited as long as (i) the silicon fine particles 5 and the binder resin can be dispersed into the dispersion solvent and (ii) the dispersion solvent can be dried after application of the dispersion solution B. Examples of the dispersion solvent are: toluene, benzene, xylene, hexane, and tetradecane. These dispersion solvents can be used solely or in combination of two or more kinds. A dispersion method is not specifically limited. For example, the dispersion can be performed by use of the ultrasonic dispersion device at a normal temperature. A content of the silicon fine particles with respect to the dispersion solvent is preferably in a range of 3 wt % to 50 wt %. In a case where the content is less than 3 wt %, a layer-forming process has to be carried out several tens of times so as to produce the electron acceleration layer 4. Accordingly, it is difficult to obtain an electron acceleration layer 4 having a uniform thickness. Meanwhile, in a case where the content is more than 50 wt %, the aggregation of the silicon fine particles 5 occurs. The content is more preferably in a range of 20 wt % to 30 wt %, in particular.

Next, the dispersion solution B thus obtained and the conductive fine particles 6 are mixed with each other to obtain a mixed solution D. A mixing method is not particularly limited, and may be for example a mixing at a normal temperature. A content of the binder resin contained in the mixing solution D is preferably within a range of 5 wt % to 15 wt % with respect to the solvent of the mixing solution D containing the silicon fine particles 5 and the conductive fine particles 6. The content is more preferably within a range of 10 wt % to 12 wt % with respect to the solvent of the mixing solution D.

In a case where the conductive fine particles 6 are in a powdery state, it is preferable to obtain the dispersion solution D by mixing (i) a conductive fine particle dispersion solution C which is obtained by dispersing the conductive fine particles 6 into a dispersion solvent and (ii) the dispersion solution B. The dispersion solvent into which the conductive fine particles 6 are dispersed is not specifically limited as long as (i) dispersion of the conductive fine particles 6 is possible and (ii) the dispersion solvent can be dried after application of the dispersion solution D. Examples of the dispersion solvent are hexane and toluene. The conductive fine particle dispersion solution C may be a liquid nano-colloidal solution of the conductive fine particles. When the liquid nano-colloidal solution of the conductive fine particles is used, it is possible to form the electron acceleration layer 4 in which the conductive fine particles are uniformly dispersed. Examples of the nano-colloidal solution of the conductive fine particles are a gold nanoparticle colloidal solution fabricated and marketed by Harima Chemicals, Inc., silver nanoparticles fabricated and marketed by Applied Nano Particle Laboratory Co., a platinum nanoparticle colloidal solution and a palladium nano-particle colloidal solution fabricated and marketed by Tokuriki Chemicals Research Co., Ltd., and nickel nanoparticle paste fabricated and marketed by IOX K.K. A solvent of the nano-colloidal solution of the conductive fine particles is not specifically limited as long as (i) colloidal dispersion of the silicon fine particles 5 is possible and (ii) the solvent can be dried after application of the nano-colloidal solution. Examples of the solvent are toluene, benzene, xylene, hexane, and tetradecane.

A content of the conductive fine particles 6 is preferably within a range of 0.5 wt % to 30 wt %. If the content is less than 0.5 wt %, then the conductive fine particles 6 do not enhance an electrical current passing through the element. On the other hand, if the content is more than 30 wt %, the conductive fine particles are aggregated. It is more preferable that the content of the conductive fine particles 6 be within a range of 2 wt % to 20 wt %.

Then, the electron acceleration layer 4 is formed by applying, on the electrode substrate 2, the above fine particle dispersion solution A or the mixed solution D, and then carrying out, for example, a spin coating method (step of forming the electron acceleration layer).

A predetermined film thickness of the electron acceleration layer 4 is able to be achieved by repeating, a plurality of times, a film formation process and a drying process using the spin coating method. In a case of using the fine particle dispersion solution A, an electron acceleration layer 4 in which the silicon fine particles 5 and the conductive fine particles 6 are dispersed is obtained. In a case of using the mixed solution D, an electron acceleration layer 4 in which the silicon fine particles, the conductive fine particles, and the binder resin are dispersed is obtained. For example, the electron acceleration layer 4 is obtained by curing, at a room temperature, a layer (i) having a film thickness of 800 nm or less and (ii) being constituted of the fine particle dispersion solution A or of the mixed solution D, for about 1 to 3 hours. The above layer is obtained by forming one or two layer(s) of the fine particle dispersion solution A or the mixed solution D, under a condition where the spin coating is carried out at 3000 rpm.

Other than the spin coating method, the electron acceleration layer 4 can be formed by, for example, a dropping method or a spray coating method. Then, the thin-film electrode 3 is formed on the electron acceleration layer 4 (step of forming the thin-film electrode). For forming the thin-film electrode 3, a magnetron sputtering method can be used, for example. The thin-film electrode 3 may be formed by, for example, an ink-jet method, the spin coating method, or a vapor deposition method.

In a case of forming the thin-film electrode 3 so that the thin-film electrode 3 has a porous structure, the following process are carried out. FIGS. 4(a) through 4(d) are diagrams illustrating a process of forming the thin-film electrode having the porous structure. First, the electron acceleration layer 4 is formed (see FIG. 4(a)). Next, mask particles 11 are applied on a top surface of the electron acceleration layer 4 (see FIG. 4(b)). Then, a material of the thin-film electrode is applied (see FIG. 4(c)). Thereafter, the mask particles 11 are removed from the electron acceleration layer 4 so as to finish the thin-film electrode 3 as illustrated in FIG. 4(d). The mask particles 11 can be silica particles, glass bead particles, or acrylic fine particles, for example. A size of each of the mask particles 11 can be determined in accordance with an intended size of a pore to be made on the thin-film electrode 3. For example, in a case of using, as the mask particles 11, silica particles having an average particle diameter of 8 µm, it is possible to form, on the thin-film electrode, pores each having a diameter of approximately 4.5 µm.

The mask particles 11 can be applied for example in the following manner. The mask particles 11 are mixed with a solvent, and then subjected to an ultrasonic dispersion process so as to obtain a mask particle dispersion solution in which the mask particles 11 are dispersed in the solvent. Next, the mask particle dispersion solution is applied on the top surface of the electron acceleration layer by the dropping method or the spin coating method. Then, the solvent of the mask particle dispersion solution is naturally dried.

The material of the thin-film electrode is applied by for example magnetron sputtering. The mask particles serve as shielding members which block off the material, of the thin-film electrode, being dropped by the sputtering etc. Thus, there are formed, on the top surface of the electron acceleration layer, regions not coated with the material of the thin-film electrode. In the course of sputtering, part of the material of the thin-film electrode flows around each of the mask particles 11 while the material is being deposited. As such, each of the pores, which is obtained after the mask particles 11 are removed, has a diameter smaller than that of each of the mask particles 11.

The mask particles 11 can be removed for example by air blowing so that the mask particles 11 are blown off. It is also possible to employ another method to remove the mask particles 11.

A light emitting device 10 including the above light emitting element 1 according to the present invention is applicable for use in a backlight or a display.

EXAMPLES

The following explains a light emission experiment carried out for a light emitting element according to the present invention. Note that this experiment is merely an example of the present embodiment and by no means limits the present invention.

First, light emitting elements of Examples 1 through 5 were produced in the following manner, so as to carry out the light emission experiment.

Example 1

Silicon fine particles 5 used here were fumed silica particles (average particle diameter is 50 nm, particle diameter distribution is from 4 nm to 200 nm) manufactured by Cabot Corporation. Specifically, the silicon fine particles 5 used here were fumed silica particles of model number TGC-413, whose surfaces were treated with hexamethyldisilazane so as to be hydrophobic. Conductive fine particles 6 used here were silver nanoparticles (average particle diameter of silver nanoparticles is 10 nm (including 1 nm of an alcoholate insulating film which coats the silver nanoparticles)) made by Applied Nano Particle Laboratory Co.

First, (i) 3 mL of toluene, serving as a dispersion solvent, and (ii) 0.5 g of silicon fine particles were supplied into a 10 mL reagent bottle. The reagent bottle was stirred by using an ultrasonic dispersion device for 10 minutes so as to disperse the silicon fine particles 5. Next, 0.125 g of the conductive fine particles 6 were additionally supplied into the reagent bottle, and then subjected to the ultrasonic dispersion process as above. Then, 0.3 mL of phenylmethyl silicon resin (TSR-144, made by Momentive Performance Materials Inc.), serving as binder resin, was added, and then subjected to the ultrasonic dispersion process for 5 minutes. In this way, a fine particle dispersion solution, in which the silicon fine particles 5, the conductive fine particles 6, and the binder resin were dispersed in the dispersion solvent, was obtained.

An electrode substrate 2 used here was a 25 mm square glass substrate, on which an ITO thin film was vapor-deposited. A layer of the fine particle dispersion solution was deposited on a surface of the electrode substrate 2 by a spin-coating method (3000 RPM, 10 seconds), so as to obtain an electron acceleration layer 4. The electron acceleration layer 4 was dried at a room temperature for 3 hours. The electron acceleration layer 4 thus dried had a film thickness of 750 nm.

Next, (i) 4 mL of ethanol, serving as a dispersion solvent and (ii) 0.1 g of spherical silica particles (SE-5V, made by TOKUYAMA Corp., average particle diameter is 8 µm), serving as mask particles 11, were supplied into a 10 mL reagent bottle, and the reagent bottle was subjected to the ultrasonic dispersion process for 5 minutes. In this way, a dispersion solution of the mask particles 11 was obtained. The dispersion solution of the mask particles was applied three times on the above electron acceleration layer 4 by the spin-coating method, and then dried at a room temperature so as to dry off ethanol.

On a surface of the electron acceleration layer 4 thus obtained, a thin-film electrode 3 made of Au—Pd, having a film thickness of 50 nm, was formed by a magnetron sputtering method. After the sputtering, the a surface of the thin-film electrode 3 was subjected to air blowing, so as to blow off the mask particles 11 applied on the surface of the electrode acceleration layer 4. In this way, the thin-film electrode 3 having a porous structure was obtained. On the surface of the thin-film electrode 3 made of Au—Pd, regions where the mask particles 11 had been positioned became pores (microscopic pores), which had an average diameter of 4.5 µm. The pores each had an electrode structure where the electrode acceleration layer 4, which was underneath the thin-film electrode 3, was exposed. A dispersion density of the pores was found to be 93 pores/cm$^2$ by actual measurement.

The light emitting element of Example 1 thus obtained was placed in vacuum of $1 \times 10^{-8}$ ATM, and received a direct-current voltage applied between its ITO electrode and thin-film electrode 3. It was observed that electrons passed through the thin-film electrode 3 having the porous structure, and were emitted (0.33 mA/cm$^2$ at a voltage of 16 V) out of the element. Further, it was observed with eyes that the entire thin-film electrode 3 emitted light of orange.

Example 2

As described earlier, in a case where the light emitting element is driven under vacuum of $1 \times 10^{-8}$ ATM by applying only a direct-current voltage, the light emitting element emits intense light only immediately after receiving the voltage. The intensity of light decreases as time passes. Under the circumstances, in the present example, an alternate-current voltage (8 Vp-p, frequency: 10 Hz), on which a direct-current voltage (8V) was superimposed, was applied between the ITO electrode (conductive material) 2a and the thin-film electrode 3 (see FIG. 5). This was carried out with respect to a light emitting element which is same as that of Example 1. As a result, emitted light remained at a level of the intense light, which was emitted immediately after the direct-current voltage was applied. Further, variation in the amount of light emitted was reduced.

Example 3

Silicon fine particles 5 used here were fumed silica particles (average particle diameter is 50 nm, particle diameter distribution is from 4 nm to 200 nm) manufactured by Cabot Corporation. Specifically, the silicon fine particles 5 used here were fumed silica particles of model number TGC-413, whose surfaces were treated with hexamethyldisilazane so as to be hydrophobic. Conductive fine particles 6 used here were silver nanoparticles made by Applied Nano Particle Laboratory Co. (average particle diameter of silver nanoparticles is 10 nm (including 1 nm of an alcoholate insulating film which coats the silver nanoparticles)).

Next, (i) 1.5 mL of hexane, serving as a dispersion solvent and (ii) 0.25 g of silicon fine particles 5 were supplied into a 10 mL reagent bottle, and the reagent bottle was stirred by using the ultrasonic dispersion device for 10 minutes so as to disperse the silicon fine particles 5. Then, 0.06 g of silver nanoparticles were additionally supplied, and then subjected to the ultrasonic dispersion process as above. Thereafter, 0.075 g of silicon resin (SR2411) made by Dow Corning Toray Co., Ltd., serving as binder resin, was added, and then stirred by using a stirrer for 10 minutes. In this way, a dispersion solution, in which the silicon fine particles 5, the conductive fine particles 6, and the binder resin were dispersed in the dispersion solvent, was obtained.

An electrode substrate 2 used here was a 25 mm square glass substrate, on which an ITO thin film was vapor-deposited. A layer of the fine particle dispersion solution was deposited on a surface of the electrode substrate 2 by the spin-coating method (3000 RPM, 10 seconds). Thereafter, the layer was cured for 2 minutes by using a heating plate set to 150° C. In this way, an electron acceleration layer 4 was obtained. The electron acceleration layer 4 thus obtained had a film thickness of 750 nm.

Next, (i) 4 mL of ethanol, serving as a dispersion solvent and (ii) 0.1 g of spherical silica particles (SE-5V, made by TOKUYAMA Corp., average particle diameter is 8 μm), serving as mask particles 11, were supplied into a 10 mL reagent bottle, and the reagent bottle was subjected to the ultrasonic dispersion process for 5 minutes. In this way, a dispersion solution of the mask particles was obtained. The dispersion solution of the mask particles was applied three times on the above electron acceleration layer 4 by the spin-coating method (3000 RPM, 10 seconds), and then dried at a room temperature so as to dry off ethanol.

On a surface of the electron acceleration layer 4 thus obtained, a thin-film electrode 3 made of Au—Pd, having a film thickness of 50 nm, was formed by a magnetron sputtering method. After the sputtering, a surface of the thin-film electrode 3 was subjected to air blowing, so as to blow off the mask particles 11 applied on the surface of the electrode acceleration layer 4. In this way, the thin-film electrode 3 having a porous structure was obtained. On the surface of the thin-film electrode 3 made of Au—Pd, regions where the mask particles 11 had been positioned became pores (microscopic pores), which had an average diameter of 4.5 μm. The pores each had an electrode structure where the electrode acceleration layer 4, which is underneath the thin-film electrode 3, was exposed. A dispersion density of the pores was found to be 93 pores/cm$^2$ by actual measurement.

The light emitting element of Example 3 thus obtained was placed in vacuum of $1 \times 10^{-8}$ ATM, and received a direct-current voltage applied between its ITO electrode and thin-film electrode 3. As a result, it was observed that electrons passed through the thin-film electrode 3, and were emitted (0.33 mA/cm$^2$ at a voltage of 14.3 V) out of the element. Further, dotted white lights dispersed all over the surface of the thin-film electrode 3 were observed with eyes.

Example 4

Silicon fine particles 5 used here were fumed silica C413 (made by Cabot Corporation) having an average particle diameter of 50 nm. Specifically, each of the fumed silica C413 had a surface treated with hexamethyldisilazane. A basic dispersant 60 used here was AJISPER PB821 (made by Ajinomoto Fine-Techno Co., Inc.).

First, (i) 3.0 g of toluene, serving as a dispersion solvent and (ii) 0.03 g of the basic dispersant 60 were supplied into a 10 mL reagent bottle. The reagent bottle was stirred by using the ultrasonic dispersion device, so as to disperse the basic dispersant 60. Next, 0.25 g of the silicon fine particles 5 were additionally supplied into the reagent bottle, and the reagent bottle was stirred by using the ultrasonic dispersion device in the same way as above. This ultrasonic dispersion process was carried out for approximately 10 minutes. In this way, a fine particle dispersion solution, in which the silicon fine particles 5 and the basic dispersant 60 were dispersed in toluene, was obtained.

An electrode substrate 2 used here was a 25 mm square glass substrate, on which an ITO thin film was vapor-deposited. The fine particle dispersion solution was dropped onto a surface of the electrode substrate 2, and subjected to the spin coating. In this way, an electron acceleration layer 4 was obtained. In the course of the spin coating, the dispersion solution was dropped onto the surface of the substrate while the substrate was being rotated at 500 RPM for 5 seconds, and then the substrate was further rotated at 3000 RPM for 10 seconds. This spin coating process was repeated twice so as to deposit, on the electrode substrate 2, two layers of the fine particle dispersion solution. Thereafter, the layers were naturally dried at a room temperature so as to obtain the electron acceleration layer 4. The electron acceleration layer 4 thus obtained had a film thickness of 800 nm.

On the electron acceleration layer 4 which was formed on the surface of the electrode substrate 2, a thin-film electrode 3 was formed by a magnetron sputtering method. The thin-film electrode 3 was made of Au—Pd, and had a film thickness of 50 nm and the surface area of 0.014 cm$^2$. In the course of formation of the thin-film electrode 3, pores were formed on the thin-film electrode 3 by using mask particles, in a same manner as in Example 1.

The light emitting element of Example 4 thus obtained was placed in vacuum of $1 \times 10^{-8}$ ATM, and received a direct-current voltage applied between its ITO electrode and thin-film electrode 3. As a result, it was observed that electrons passed through the thin-film electrode 3, and were emitted (0.08 mA/cm$^2$ at a voltage of 16 V) out of the element. Further, dotted orange lights dispersed all over the surface of the thin-film electrode 3 were observed with eyes.

Example 5

A light emitting element of Example 5 was formed in a same manner as in Example 3, except that the thin-film electrode 3 was formed with no spaces without using the mask particles. That is, the light emitting element of Example 5 did not have pores. The light emitting element of Example 5 was placed in vacuum of $1\times10^{-8}$ ATM, and received a direct-current voltage applied between its ITO electrode and thin-film electrode 3. As a result, it was observed that electrons transmitted the thin-film electrode 3, and were emitted (0.13 mA/cm$^2$ at a voltage of 13 V) out of the element. Further, white light concentrated on an edge portion of the thin-film electrode 3 was observed with eyes.

In Example 3, hexane was used as the dispersion solvent, and white lights concentrated on edge portions were observed. These white lights were emitted probably due to (i) an intermediate level formed by the silver nanoparticles serving as the conductive fine particles 6, and besides, (ii) a residual stress generated between a silicon fine particle layer and the thin-film electrode (surface electrode). With a cathodoluminescence spectral analysis, it is possible to find a relationship between (i) a stress on a microscopic area and (ii) a luminous wavelength on the microscopic area. According to the cathodoluminescence spectral analysis, (i) blue transition is observed in a case of a tensile stress, (ii) red transition is observed in a case of a compression stress, and (iii) a green wavelength is obtained in the middle of the blue and red transitions. That is, since the electron acceleration layer 4 of Example 3 includes a deposition of fine particles, the tensile and compression stresses are mixedly generated. This is probably the reason of the white light emission. Moreover, when the element whose edge portions emit white light is actually observed under SEM, it is observed that the surface of the element is cracked (separated) along the edge portions. This suggests that stresses are concentrated on the edge portions.

[Configuration of Present Invention]

As so far described, a light emitting element of the present invention includes: an electrode substrate; a thin-film electrode; and an electron acceleration layer sandwiched between the electrode substrate and the thin-film electrode, the electron acceleration layer containing (i) silicon fine particles and (ii) at least one of conductive fine particles and a basic dispersant, as a result of a voltage applied between the electrode substrate and the thin-film electrode, electrons being accelerated in the electron acceleration layer so as to be turned into hot electrons, and the hot electrons exciting surfaces of the silicon fine particles contained in the electron acceleration layer so that the surfaces of the silicon fine particles emit light.

The light emitting element of the present invention is able to (i) be produced by a silicon material, which is available at a low price, through a simple production process, and (ii) efficiently emit light. That is, the light emitting element of the present invention is a novel light emitting element, which has not been achieved by the conventional techniques.

The light emitting element of the present invention can be configured such that, besides the above configuration, the thin-film electrode has a porous structure.

According to the above configuration, since the thin-film electrode has the porous structure, a lot of edge portions are formed around pores of the thin-film electrode. In the edge portions, the electrical field becomes intense. That is, the thin-film electrode having the porous structure has a lot of areas, in each of which, the electrical field is intense and thus the hot electrons are efficiently generated. Accordingly, it is possible to surely provide points where the hot electrons are generated, thereby obtaining a lot of light emission points provided all over the thin-film electrode. As such, the light-emitting element emits an increased amount of light.

The light emitting element of the present invention can be configured such that, besides the above configuration, the electron acceleration layer contains binder resin.

The binder resin is capable of increasing mechanical strength of the element, because the binder resin has high adhesiveness with respect to the electrode substrate. In a case of forming the thin-film electrode having a porous structure, for example as described later, in such a manner that (i) mask particles are applied on the electron acceleration layer, (ii) the material of the thin-film electrode is applied on the electron acceleration layer masked with the mask particles, and then (iii) the mask particles are removed from the electron acceleration layer, the following occurs. If the electron acceleration layer is weak in strength, then the electron acceleration layer will be damaged when the mask particles are removed (by for example air blowing). However, provision of the binder resin to the electron acceleration layer makes it possible to prevent the electron acceleration layer from being damaged, because such an electron acceleration layer containing the binder resin has an increased mechanical strength.

Further, since (i) the silicon fine particles and (ii) at least one of the conductive fine particles and the basic dispersant are dispersed in the binder resin, aggregation becomes hard to occur. Accordingly, performance of the light emitting element becomes uniform, and steady hot electron generation becomes possible. As such, it is possible to achieve stable light emission. Further, in a case where the electron acceleration layer contains the conductive fine particles, and further contains the binder resin, the binder resin surrounds the conductive fine particles. Accordingly, element degradation of the conductive fine particles due to oxidation, which is caused by oxygen in the atmosphere, becomes less likely to occur. Therefore, the light emitting element can be steadily operated not only in vacuum but also under the atmospheric pressure.

The light emitting element of the present invention is preferably configured such that, besides the above configuration, the silicon fine particles have an average particle size that falls within a range of 12 nm to 110 nm. In this case, a particle diameter distribution of the silicon fine particles may be broad with respect to the average particle diameter. If the average particle diameter of the silicon fine particles is too small, then the silicon fine particles are difficult to be dispersed because force between the particles is strong and thus the particles are likely to aggregate. On the other hand, if the average particle diameter of the silicon fine particles is too large, then the silicon fine particles are well dispersed. However, in this case, it is difficult to adjust (i) the film thickness of the electron acceleration layer so as to adjust resistance and (ii) a mixing rate of at least one of the conductive fine particles and the basic dispersant.

The light emitting element of the present invention is preferably configured such that, besides the above configuration, the electron acceleration layer has a film thickness that falls within a range of 700 nm to 1000 nm. The thinner the electron acceleration layer is, the more intense the electrical field becomes. Therefore, the thinner electron acceleration layer is capable of causing, with a lower voltage, electron beam excitation of a luminescence center on a surface of each of the silicon fine particles. However, the film thickness of the electron acceleration layer is preferably within the above range, because according to such an electron acceleration layer, it is possible to (i) uniformize the film thickness and (ii) adjust resistance, in a film thickness direction, of the electron acceleration layer. As such, it is possible to cause the light emitting element to uniformly emit light from an entire surface thereof.

The light emitting element of the present invention can be configured such that the electron acceleration layer contains (i) the silicon fine particles and (ii) at least the conductive fine particles, and the conductive fine particles are made of a conductor having high resistance to oxidation. To have a high resistance to oxidation here means to have a small oxide formation reaction. In general, according to a thermodynamic calculation, when a value of a change $\Delta G$ [kJ/mol] in free energy of oxide formation is negative and greater, the oxide formation reaction occurs more easily. In the present invention, a metal element whose $\Delta G$ is equal to or greater than −450 [kJ/mol] is considered to be the conductive fine particles having a high resistance to oxidation. Further, the conductive fine particles having a high resistance to oxidation also include conductive fine particles whose oxide formation reaction is made difficult to occur by attaching, on the conductive fine particles, an insulating material whose particle diameter is smaller than that of the conductive fine particles or by coating the conductive fine particles with use of such an insulating material.

According to the arrangement, because a conductor having a high resistance to oxidation is used as the conductive fine particles, element degradation due to oxidation caused by oxygen in the atmosphere becomes hard to occur. Therefore, the light emitting element can be more steadily operated even under the atmospheric pressure. Therefore, a life of the light emitting element can be extended and the light emitting element can be operated continuously for a long time even in the atmosphere.

The light emitting element of the present invention can be configured such that, besides the above configuration, the conductive fine particles are made of noble metal. Because the conductive fine particles are made of a noble metal as described above, it becomes possible to prevent element degradation such as oxidation caused by oxygen in the atmosphere. This makes it possible to extend a life of the light emitting element.

The light emitting element of the present invention can be configured such that, besides above configuration, the conductive material constituting the conductive fine particles contains at least one of gold, silver, platinum, palladium, and nickel. Because the conductor that the conductive fine particles are made of contains at least one of gold, silver, platinum, palladium, and nickel, it becomes possible to more effectively prevent element degradation such as oxidation of the conductive fine particles caused by oxygen in the atmosphere. This makes it possible to extend a life of the light emitting element.

In the light emitting element of the present invention, because control of electric conductivity is required, an average particle diameter of the conductive fine particles should be smaller than that of the silicon fine particles, and preferably in a range of 3 nm to 10 nm. In a case where an average particle diameter of the conductive fine particles is arranged to be smaller than that of the silicon fine particles and preferably in a range of 3 nm to 10 nm, the following effect is obtained. That is, a conductive path is not formed in the electron acceleration layer by the conductive fine particles. As a result, dielectric breakdown becomes difficult to occur in the electron acceleration layer. There are a lot of unexplained points in terms of a principle. However, the hot electrons are efficiently generated by use of the conductive fine particles whose average particle diameter is within the above range.

The light emitting element of the present invention can be configured such that, besides the above configuration, the conductive fine particles are surrounded by a small insulating material which is smaller than each of the conductive fine particles. The presence of the small insulating material around the conductive fine particles contributes to improvement of dispersibility of the conductive fine particles in a dispersion solution at the time when the element is produced. In addition, due to the presence, element degradation such as oxidation of the conductive fine particles caused by oxygen in the atmosphere can be more effectively prevented. This makes it possible to effectively extend a life of the light emitting element.

The light emitting element of the present invention can be configured such that, besides the above configuration, the small insulating material contains at least one of alcoholate, aliphatic acid, and alkanethiol. It contributes to improvement of dispersibility of the conductive fine particles in the dispersion solution at the time when the element is produced that the small insulating material contains at least one of alcoholate, aliphatic acid, and alkanethiol as described above. As a result, abnormal current path formation caused by an aggregate of the electrically conductive fine particles becomes difficult to occur. In addition, because the above case prevents a change in composition of particles due to oxidation of the conductive fine particles themselves that are present around the silicon fine particles, no influence on hot electron generation characteristics occurs. Therefore, a life of the light emitting element can be effectively extended.

In the light emitting element of the present invention, the small insulating material is present as an adhering substance and adheres to respective surfaces of the conductive fine particles. This adhering substance may coat respective surfaces of the conductive fine particles, as an aggregate of the particles each having a smaller average particle diameter than the average particle diameter of the conductive fine particles. In this way, the small insulating material adheres to the respective surfaces of the conductive fine particles or coats, as an aggregate of the particles each having an average particle diameter smaller than the average particle diameter of the conductive fine particles, the respective surfaces of the conductive fine particles. This presence of the small insulating material contributes to improvement in dispersibility of the conductive fine particles in the dispersion solution at the time when the element is produced. Accordingly, abnormal current path formation caused by an aggregate of the conductive fine particles becomes difficult to occur. In addition, because the above case prevents a change in composition of particles due to oxidation of the conductive fine particles themselves that are present around the silicon fine particles, no influence on hot electron generation characteristics occurs. Therefore, a life of the light emitting element can be more effectively extended.

The light emitting element of the present invention can be configured such that, besides the above configuration, the electron acceleration layer contains (i) the silicon fine particles and (ii) at least the basic dispersant, and the basic dispersant includes a polymeric material that disperses the silicon fine particles due to its steric repulsion effect, into which polymeric material an electron pair donor that donates a pair of electrons is introduced as a substituent.

Since the basic dispersant contains the polymeric material that disperses the silicon fine particles due to its steric repulsion effect, it is possible to achieve good dispersibility of the silicon fine particles. Further, it is possible to achieve a uniform dispersibility of a fine particle layer, which serves as the electron acceleration layer. As such, it is possible to reduce a process variation in the light emitting element.

In order to solve the above problem, a light emitting device of the present invention includes: any one of the light emitting elements as above; and a power supply section for applying a voltage between the electrode substrate and the thin-film electrode.

According to the above configuration, it is possible to (i) secure electrical conductivity so that a sufficient amount of electrical current passes through the element, (ii) cause the element to efficiently and stably emit the hot electrons, and (iii) cause electron beam excitation of a luminescence center on a surface of each of the silicon fine particles contained in the electron acceleration layer, so as to cause the light emitting device to efficiently and stably emit light.

The light emitting device of the present invention can be configured such that, besides the above configuration, the power supply section applies a pulsed voltage between the electrode substrate and the thin-film electrode. Further, a method of driving any one of the above light emitting elements in accordance with the present invention, includes: applying the pulsed voltage between the electrode substrate and the thin-film electrode.

The light emitting element, which includes the silicon fine particles, the electrode substrate, and the thin-film electrode, has a capacitance component because the light emitting element has a capacitor structure of a parallel plate type. Therefore, if a direct-current voltage is continuously applied to the light emitting element, then an anti-electrical field is likely to be formed inside a silicon fine particle layer, which is a conductive material. Accordingly, an electron acceleration electrical field, which is required for generating the hot electrons, is absorbed by the anti-electrical field. However, application of a pulsed voltage between the electrode substrate and the thin-film electrode, as described above, makes it possible to prevent formation of the anti-electrical field so as to keep a large amount of light being emitted from the silicon fine particles and to reduce variation in the amount of light emitted.

Application of the pulsed voltage between the electrode substrate and the thin-film electrode makes it possible to keep intense light being emitted, and to emit light with a small variation in an amount of light emission.

Provision of the light emitting device of the present invention to an image display device makes it possible to provide a high-quality image display device capable of efficiently and stably emitting light.

In order to solve the above problem, a method of producing the light emitting element of the present invention, the light emitting element including an electron acceleration layer in which electrons are accelerated so as to be turned into hot electrons, and the hot electrons exciting surfaces of silicon fine particles contained in the electron acceleration layer of the light emitting element so that the surfaces of the silicon fine particles emits light, said method including the steps of: (a) forming, on an electrode substrate, the electron acceleration layer containing (i) the silicon fine particles and (ii) at least one of conductive fine particles and a basic dispersant; and (b) forming a thin-film electrode on the electron acceleration layer.

According to the above method, the electron acceleration layer containing (i) silicon fine particles and (ii) at least one of the conductive fine particles and the basic dispersant is provided on the electrode substrate. This simple production method makes it possible to produce a light emitting element capable of efficiently emitting light, wherein the light is emitted by the hot electrons causing electron beam excitation of the luminescence center on the surfaces the silicon fine particles.

The method of producing the light emitting element of the present invention can be configured such that, besides the above configuration, the step (b) includes: (i) applying mask particles on the electron acceleration layer, (ii) applying a material of the thin-film electrode on the electron acceleration layer masked with the mask particles, and then (iii) removing the mask particles from the electron acceleration layer.

According to the above method, it is possible to form the thin-film electrode having the porous structure through a simple method, in which (i) the mask particles are applied on the electron acceleration layer, (ii) the material of the thin-film electrode is applied on the electron acceleration layer masked with the mask particles, and then (iii) the mask particles are removed from the electron acceleration layer. Accordingly, it is possible to produce a light emitting element which emits an increased amount of light.

The embodiments discussed in the foregoing description of embodiments and concrete examples serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. Further, it is needles to say that a numeric value outside the range described in the Specification is also encompassed in the present invention provided the numeric value is within a rational range which is not against the gist of the present invention.

INDUSTRIAL APPLICABILITY

The light emitting element according to the present invention is able to (i) be produced by a silicon material, which is available at a low price, through a simple production method, and efficiently emit light. Accordingly, the light emitting element is applicable for use in, for example, an image display device.

REFERENCE SIGNS LIST

1 Light Emitting Element
2 Electrode Substrate
3 Thin-film Electrode
4 Electron Acceleration Layer
5 Silicon Fine Particles
6 Conductive Fine Particles
7 Power Supply (Power Supply Section)
10 Light Emitting Device
60 Basic Dispersant

The invention claimed is:
1. A light emitting element, comprising:
an electrode substrate;
a thin-film electrode; and
an electron acceleration layer sandwiched between the electrode substrate and the thin-film electrode,
the electron acceleration layer containing (i) silicon fine particles and (ii) at least one of conductive fine particles and a basic dispersant that includes a polymeric material that disperses the silicon fine particles due to its steric repulsion effect, into which polymeric material an electron pair donor that donates a pair of electrons is introduced as a substituent, as a result of a voltage applied between the electrode substrate and the thin-film electrode, electrons being accelerated in the electron acceleration layer so as to be turned into hot electrons, and the hot electrons exciting surfaces of the silicon fine particles contained in the electron acceleration layer so that the surfaces of the silicon fine particles emit light.

2. The light emitting element according to claim 1, wherein the thin-film electrode has a porous structure.

3. The light emitting element according to claim 1, wherein the electron acceleration layer contains binder resin.

4. The light emitting element according to claim wherein the silicon fine particles have an average particle size that falls within a range of 12 nm to 110 nm.

5. The light emitting element according to claim 1, wherein the electron acceleration layer has a film thickness that falls within a range of 700 nm to 1000 nm.

6. The light emitting element according to claim 1, wherein:
the electron acceleration layer contains (i) the silicon fine particles and (ii) at least the conductive fine particles, and
the conductive fine particles are made of a conductor having high resistance to oxidation.

7. The light emitting element according to claim 6, wherein the conductive fine particles are made of a noble metal.

8. The light emitting element according to claim 6, wherein the conductor constituting the conductive fine particles contains at least one of gold, silver, platinum, palladium, and nickel.

9. The light emitting element according to claim 6, wherein the conductive fine particles have an average particle diameter that falls within a range of 3 nm to 10 nm.

10. The light emitting element according to claim 6, wherein the conductive fine particles are surrounded by a small insulating material which is smaller than each of the conductive fine particles.

11. The light emitting element according to claim 10, wherein the small insulating material contains at least one of alcoholate, aliphatic acid, and alkanethiol.

12. A light emitting device, comprising:
a light emitting element as set forth in claim 1; and
a power supply section for applying the voltage between the electrode substrate and the thin-film electrode.

13. The light emitting device according to claim 12, wherein the power supply section applies a pulsed voltage between the electrode substrate and the thin-film electrode.

14. An image display device, comprising a light emitting device as set forth in claim 12.

15. A method of driving a light emitting element as set forth in claim 1, comprising:
applying a pulsed voltage between the electrode substrate and the thin-film electrode.

16. A method of producing a light emitting element,
the light emitting element including an electron acceleration layer in which electrons are accelerated so as to be turned into hot electrons, and
the hot electrons exciting surfaces of silicon fine particles contained in the electron acceleration layer of the light emitting element so that the surfaces of the silicon fine particles emits light,
said method comprising the steps of:
(a) forming, on an electrode substrate, the electron acceleration layer containing (i) the silicon fine particles and (ii) at least one of conductive fine particles and a basic dispersant; and
(b) forming a thin-film electrode on the electron acceleration layer.

17. The method according to claim 16, wherein the step (b) comprises: (i) applying mask particles on the electron acceleration layer, (ii) applying a material of the thin-film electrode on the electron acceleration layer masked with the mask particles, and then (iii) removing the mask particles from the electron acceleration layer.

* * * * *